April 21, 1953     W. E. SCHADE     2,635,505
PHOTOGRAPHIC OBJECTIVE CONSISTING OF TWO OUTER NEGATIVE
DOUBLETS AND TWO INNER POSITIVE SINGLETS
Filed Dec. 1, 1951
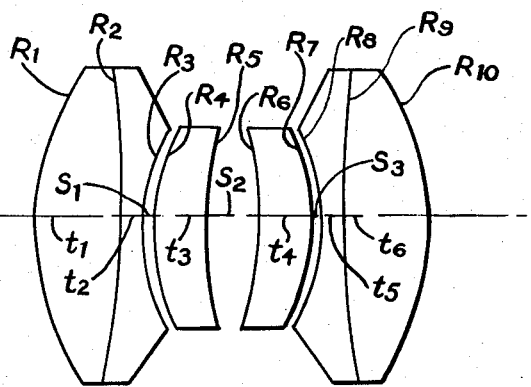
| E.F = 100mm. | | | | f/4.5 |
|---|---|---|---|---|
| LENS | N | V | RADII | THICKNESSES |
| 1 | 1.697 | 56.2 | $R_1 = +27.71$ mm. | $t_1 = 8.74$ mm. |
| 2 | 1.635 | 43.8 | $R_2 = -113.$ | $t_2 = 1.85$ |
|   |       |      | $R_3 = +19.98$ | $S_1 = 1.35$ |
| 3 | 1.596 | 39.7 | $R_4 = +29.56$ | $t_3 = 4.25$ |
|   |       |      | $R_5 = +49.37$ | $S_2 = 4.45$ |
| 4 | 1.550 | 45.8 | $R_6 = -49.13$ | $t_4 = 3.89$ |
|   |       |      | $R_7 = -27.13$ | $S_3 = 1.02$ |
| 5 | 1.657 | 40.4 | $R_8 = -21.31$ | $t_5 = 1.82$ |
| 6 | 1.734 | 51.2 | $R_9 = +83.0$ | $t_6 = 8.74$ |
|   |       |      | $R_{10} = -31.00$ | |
*Willy E. Schade*
INVENTOR.
BY
ATTY. & AGT.

Patented Apr. 21, 1953

2,635,505

UNITED STATES PATENT OFFICE 2,635,505

PHOTOGRAPHIC OBJECTIVE CONSISTING OF TWO OUTER NEGATIVE DOUBLETS AND TWO INNER POSITIVE SINGLETS

Willy E. Schade, Rochester, N. Y., assignor to Eastman Kodak Company, Rochester, N. Y., a corporation of New Jersey Application December 1, 1951, Serial No. 259,396

2 Claims. (Cl. 88—57)

This invention relates to photographic objectives of the type comprising four meniscus components symmetrically arranged about and all concave toward a diaphragm, the outer two being negative doublets and the inner two being simple positive elements.

The object of the invention is to provide an objective which is highly corrected at apertures up to f/4.5 and covers a field of view of about ±35°, which is comparatively inexpensive to produce, and which is compact in length and affords good illumination at the corners of the picture area.

According to the present invention, an objective is made up consisting of four meniscus components symmetrically arranged with respect to a diaphragm position and concave thereto, the outer two being negative doublets whose cemented surfaces have positive power and the inner two being simple positive elements, in which the radii of curvature R of the optical surfaces, the thicknesses t of the lens elements, the spacings s between the components, and the refractive indices N of the glasses used, each numbered by subscripts from front to rear are all within the ranges defined by the following algebraic inequalities:

$$0.26\ F < +R_1 < 0.30\ F$$
$$1.05\ F < -R_2 < 1.75\ F$$
$$0.19\ F < +R_3 < 0.21\ F$$
$$0.29\ F < +R_4 < 0.31\ F$$
$$0.47\ F < +R_5 < 0.55\ F$$
$$0.47\ F < -R_6 < 0.55\ F$$
$$0.24\ F < -R_7 < 0.28\ F$$
$$0.20\ F < -R_8 < 0.22\ F$$
$$0.75\ F < +R_9 < 1.30\ F$$
$$0.30\ F < -R_{10} < 0.32\ F$$
$$0.05\ F < t_1 < 0.12\ F$$
$$0.01\ F < t_2 < 0.05\ F$$
$$0.01\ F < s_1 < 0.04\ F$$
$$0.02\ F < t_3 < 0.07\ F$$
$$0.02\ F < s_2 < 0.08\ F$$
$$0.02\ F < t_4 < 0.07\ F$$
$$0.00 < s_3 < 0.03\ F$$
$$0.01\ F < t_5 < 0.05\ F$$
$$0.05\ F < t_6 < 0.12\ F$$
$$1.67 < N_1 < 1.72$$
$$1.61 < N_2 < 1.66$$
$$1.57 < N_3 < 1.62$$
$$1.52 < N_4 < 1.58$$
$$1.62 < N_5 < 1.68$$
$$1.70 < N_6 < 1.76$$

wherein the + and − values of the radii denote surfaces respectively convex and concave to the front, where N is the customary mean refractive index in each case, and where F is the focal length of the objective.

I have found that an exceptionally high degree of correction of the aberrations is attained by objectives within these limits, particularly with respect to zonal aberrations and astigmatism.

The accompanying drawing shows in diagrammatic axial section an objective according to the invention and gives constructional specifications for one example. These specifications are repeated in the following table for convenience:

EF=100 mm.   f/4.5

| Lens | N | V | Radii in mm. | Thicknesses in mm. |
|---|---|---|---|---|
| 1 | 1.6968 | 56.2 | $R_1 = + 27.71$ | $t_1 = 8.74$ |
|   |        |      | $R_2 = -112.6$  |               |
| 2 | 1.6350 | 43.8 |                 | $t_2 = 1.85$ |
|   |        |      | $R_3 = + 19.98$ |               |
|   |        |      |                 | $s_1 = 1.35$ |
|   |        |      | $R_4 = + 29.56$ |               |
| 3 | 1.5956 | 39.7 |                 | $t_3 = 4.25$ |
|   |        |      | $R_5 = + 49.37$ |               |
|   |        |      |                 | $s_2 = 4.45$ |
|   |        |      | $R_6 = - 49.13$ |               |
| 4 | 1.5497 | 45.8 |                 | $t_4 = 3.89$ |
|   |        |      | $R_7 = - 27.13$ |               |
|   |        |      |                 | $s_3 = 1.02$ |
|   |        |      | $R_8 = - 21.31$ |               |
| 5 | 1.6571 | 40.4 |                 | $t_5 = 1.82$ |
|   |        |      | $R_9 = + 83.0$  |               |
| 6 | 1.7340 | 51.2 |                 | $t_6 = 8.74$ |
|   |        |      | $R_{10} = - 31.00$ |            |
|   |        |      |                 | BF=82.5 |

In this table as in the drawing the lens elements are numbered in the first column in order from front to rear. The second and third columns give the refractive indices N for the D line of the spectrum and the conventional dispersive index V of the respective elements. The last two columns give the radii of curvature R of the lens surfaces, the thicknesses t of the lens elements, and the spaces s between lens components each numbered by subscripts from front to rear. Also, the equivalent focal length EF and the back focal length BF are given. The + and − values of the radii indicate surfaces respectively convex and concave to the front.

It may be noted that surfaces 3 and 4 meet at about 23 mm. diameter and surfaces 7 and 8 at about 25 mm. diameter.

It is directly evident from this table that each of the radii, thicknesses, spaces and indices is within the limits previously set forth in accordance with the invention. The color is corrected according to the usual rules for color correction.

This objective covers an angular field of ±35°.
The following aberrations have been computed:

Spherical aberration: mm.
- f/4.5 — +.224
- f/6.3 — −.171

Coma:
- f/4.5 — −.019
- f/6.3 — −.014

Distortion:
- 33.5° — +.398
- 23.1° — +.101

Secondary curvature:
- 33.5° — +1.164
- 23.1° — −0.788

Primary curvature:
- 33.5° — +1.055
- 23.1° — −0.853

Particularly noteworthy are the small zonal spherical aberration and the small astigmatism (difference between primary and secondary curvatures) which have been obtained according to the invention.

I claim:

1. A photographic objective consisting of four meniscus components symmetrically arranged with respect to a diaphragm position and concave thereto, the outer two being negative doublets whose cemented surfaces have positive power and the inner two being simple positive elements, in which the radii of curvature R of the optical surfaces, the thicknesses $t$ of the lens elements, the spacings $s$ between the components and the refractive indices N of the glasses used, each numbered from front to rear by subscripts, are all within the ranges defined by the following algebraic inequalities:

$0.26\ F < +R_1 < 0.30\ F$
$1.05\ F < -R_2 < 1.75\ F$
$0.19\ F < +R_3 < 0.21\ F$
$0.29\ F < +R_4 < 0.31\ F$
$0.47\ F < +R_5 < 0.55\ F$
$0.47\ F < -R_6 < 0.55\ F$
$0.24\ F < -R_7 < 0.28\ F$
$0.20\ F < -R_8 < 0.22\ F$
$0.75\ F < +R_9 < 1.30\ F$
$0.30\ F < -R_{10} < 0.32\ F$
$0.05\ F < t_1 < 0.12\ F$
$0.01\ F < t_2 < 0.05\ F$
$0.01\ F < s_1 < 0.04\ F$
$0.02\ F < t_3 < 0.07\ F$
$0.02\ F < s_2 < 0.08\ F$
$0.02\ F < t_4 < 0.07\ F$
$0.00 < s_3 < 0.03\ F$
$0.01\ F < t_5 < 0.05\ F$
$0.05\ F < t_6 < 0.12\ F$
$1.67 < N_1 < 1.72$
$1.61 < N_2 < 1.66$
$1.57 < N_3 < 1.62$
$1.52 < N_4 < 1.58$
$1.62 < N_5 < 1.68$
$1.70 < N_6 < 1.76$ where the + and − values of the radii indicate surfaces respectively convex and concave to the front, and where F is the focal length of the objective.

2. A photographic objective substantially according to the following specifications:

| Lens | N | V | Radii | Thicknesses |
|---|---|---|---|---|
| 1 | 1.70 | 56 | $R_1 = +.28\ F$ | $t_1 = .09\ F$ |
|  |  |  | $R_2 = -1.1\ F$ |  |
| 2 | 1.64 | 44 |  | $t_2 = .02\ F$ |
|  |  |  | $R_3 = +.20\ F$ |  |
|  |  |  |  | $s_1 = .01\ F$ |
|  |  |  | $R_4 = +.30\ F$ |  |
| 3 | 1.60 | 40 |  | $t_3 = .04\ F$ |
|  |  |  | $R_5 = +.49\ F$ |  |
|  |  |  |  | $s_2 = .04\ F$ |
|  |  |  | $R_6 = -.49\ F$ |  |
| 4 | 1.55 | 46 |  | $t_4 = .04\ F$ |
|  |  |  | $R_7 = -.27\ F$ |  |
|  |  |  |  | $s_3 = .01\ F$ |
|  |  |  | $R_8 = -.21\ F$ |  |
| 5 | 1.66 | 40 |  | $t_5 = .02\ F$ |
|  |  |  | $R_9 = +.8\ F$ |  |
| 6 | 1.73 | 51 |  | $t_6 = .09\ F$ |
|  |  |  | $R_{10} = -.31\ F$ |  | where the lens elements are numbered in the first column in order from the front to the rear of the objective and the corresponding refractive indices N for the D line of the spectrum and the dispersive indices V are given in the next two columns, where the radii of curvature R of the lens surfaces, the thicknesses $t$ of the lens elements and the spaces $s$ between the lens components are given in the last two columns, where the + and − values of the radii R denote surfaces respectively convex and concave to the front of the objective, and where F is the focal length of the objective.

WILLY E. SCHADE.

References Cited in the file of this patent

UNITED STATES PATENTS

| Number | Name | Date |
|---|---|---|
| 1,777,262 | Hasselkus et al. | Sept. 30, 1930 |
| 1,792,917 | Merte | Feb. 17, 1931 |

FOREIGN PATENTS

| Number | Country | Date |
|---|---|---|
| 135,853 | Great Britain | Nov. 26, 1919 |
| 278,338 | Great Britain | Dec. 8, 1927 |
| 547,739 | Great Britain | Sept. 9, 1942 |